United States Patent [19]

Katayama et al.

[11] Patent Number: 5,975,739
[45] Date of Patent: Nov. 2, 1999

[54] SINGLE-CHIP MICROCOMPUTER FOR CONTROL

[75] Inventors: Hiroshi Katayama; Mitsuo Kayano, both of Hitachi; Mitsuru Watabe, Urizura-machi, all of Japan; Junichi Ishii, Novi, Mich.; Tetsuya Ichihashi; Shoji Sasaki, both of Hitachinaka, Japan; Satoshi Tanaka, Kodaira, Japan

[73] Assignee: Hitachi, Ltd., Tokyo, Japan

[21] Appl. No.: 08/506,126

[22] Filed: Jul. 24, 1995

[30] Foreign Application Priority Data

Jul. 27, 1994 [JP] Japan .................................. 6-175120

[51] Int. Cl.⁶ ...................................................... G06F 1/04
[52] U.S. Cl. ............................................ 364/400; 395/557
[58] Field of Search .................................... 395/800, 557; 364/400

[56] References Cited

U.S. PATENT DOCUMENTS

| 4,780,818 | 10/1988 | Kubo | 364/426.023 |
|---|---|---|---|
| 4,942,522 | 7/1990 | Wilkie | 395/557 |
| 5,233,573 | 8/1993 | Bettelheim | 368/113 |
| 5,535,376 | 7/1996 | Catherwood | 395/550 |

*Primary Examiner*—Eric Coleman
*Attorney, Agent, or Firm*—Antonelli, Terry, Stout & Kraus, LLP

[57] ABSTRACT

A control processor has an output pattern generating circuit operating in cooperation with a free running timer, and a virtual OCR program for virtually realizing a large number of timer outputs by use of the output pattern generating circuit. Because more timer outputs than the actually incorporated timers are handled, the function of timer outputs is implemented with a higher degree of freedom and in a wider range of applications. For its enhanced function and availability, the control processor costs less.

11 Claims, 19 Drawing Sheets

FIG. 15

| 120-DEGREE INTERVAL PROCESS | (a) | | (b) | | (c) | | (d) | |
|---|---|---|---|---|---|---|---|---|
| | OUTPUT TIME | OUTPUT PATTERN | OUTPUT TIME | OUTPUT PATTERN | OUTPUT TIME | OUTPUT PATTERN | OUTPUT TIME | OUTPUT PATTERN |
| VIRTUAL OCR 1-1 | (f1) | 0001 | (f3) | 0010 | (f5) | 0100 | (f7) | 1000 |
| VIRTUAL OCR 1-2 | (f3) | 0010 | (f5) | 0100 | (f7) | 1000 | | |
| VIRTUAL OCR 2-1 | (f2) | 1110 | (f4) | 1101 | (f6) | 1011 | (f8) | 0111 |
| VIRTUAL OCR 2-2 | (f4) | 1101 | (f6) | 1011 | (f8) | 0111 | | |

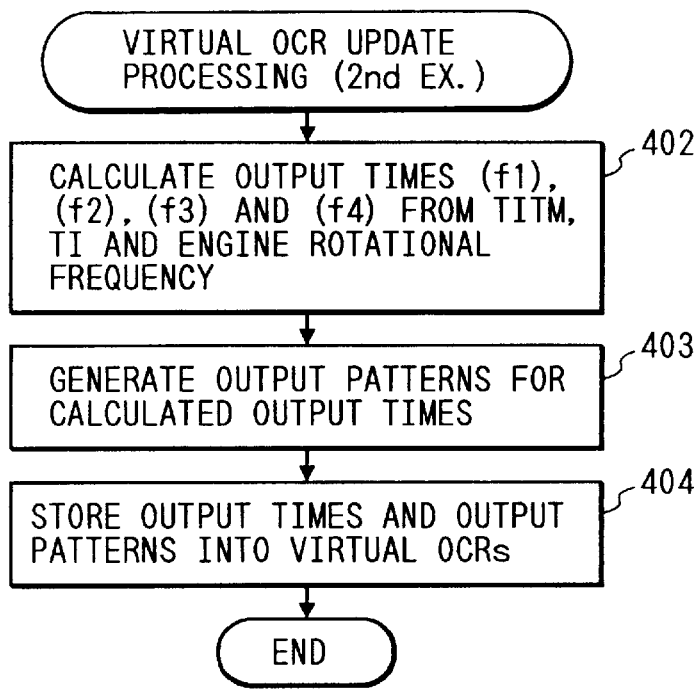
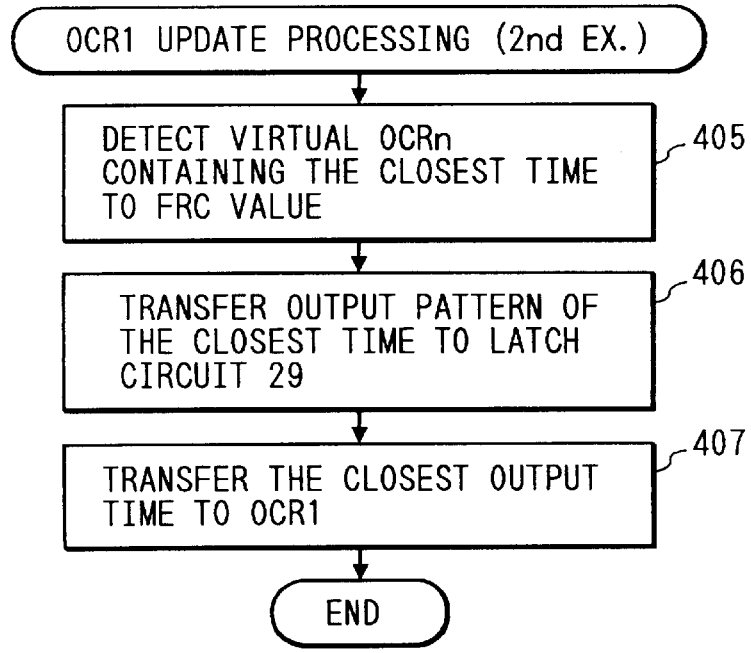

FIG. 24

| 120-DEGREE INTERVAL PROCESS | (a) | | (b) | | (c) | | (d) | |
|---|---|---|---|---|---|---|---|---|
| | OUTPUT TIME | OUTPUT PATTERN | OUTPUT TIME | OUTPUT PATTERN | OUTPUT TIME | OUTPUT PATTERN | OUTPUT TIME | OUTPUT PATTERN |
| VIRTUAL OCR 1 | (f1) | 0001 | (f3) | 0010 | (f5) | 0100 | (f7) | 1000 |
| VIRTUAL OCR 2 | (f2) | 0000 | (f4) | 0000 | (f6) | 0000 | (f8) | 0000 |
| VIRTUAL OCR 3 | (f3) | 0010 | (f5) | 0100 | (f7) | 1000 | | |
| VIRTUAL OCR 4 | (f4) | 0000 | (f6) | 0000 | (f8) | 0000 | | |

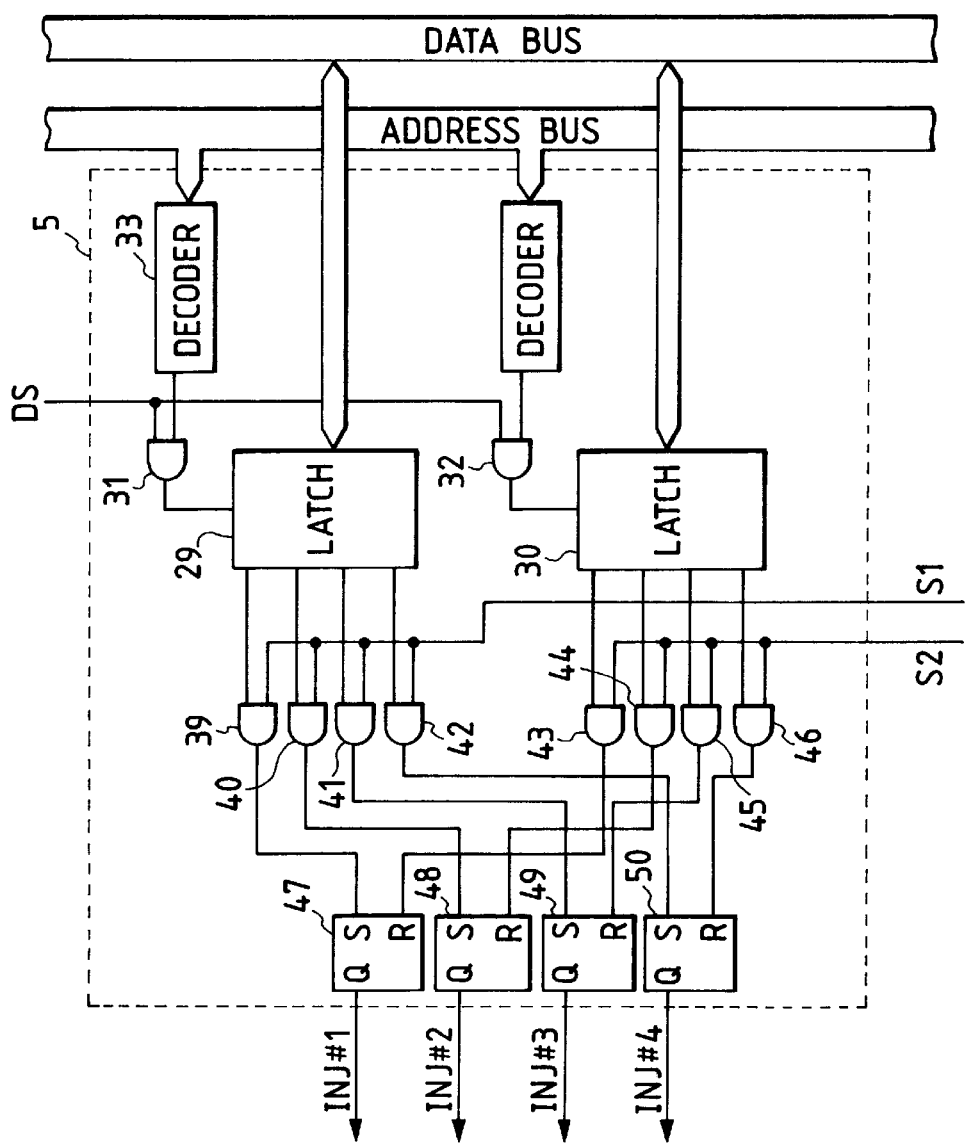

SINGLE-CHIP MICROCOMPUTER FOR CONTROL

BACKGROUND OF THE INVENTION

The present invention relates to a control processor incorporating a high-speed microcomputer and, more particularly, to a control processor that is able to adapt to various vehicle types and to be easily mounted thereon while being inexpensive to produce.

An automotive control processor is disclosed illustratively in Japanese Patent Laid-Open No. Hei 3 -228102. With the number of cylinders and the configuration of onboard sensors varying from one engine to another, the conventional engine control processor selectively employs a microcomputer having an optimum I/O configuration (comprising timers, counters, analog I/O terminals, etc.) for a particular engine controlled by that processor.

That is, conventional engine control processors each require a microcomputer incorporating a different I/O configuration depending on the engine type. Because the control processors cannot be standardized, the costs involved tend to rise.

SUMMARY OF THE INVENTION

It is therefore an object of the present invention to overcome the above and other deficiencies of the prior art and to provide an inexpensive control processor which is capable of handling more timer outputs than the actually incorporated timers so that the function of the timer, outputs may be implemented with a higher degree of freedom and in a wider range of applications than before.

In achieving the above and other objects of the invention, and according to one aspect thereof, there is provided a single-chip microcomputer for control comprising: a CPU for operation processing and internal control; a ROM for storing a control program controlling the CPU; a RAM, controlled by the CPU, for storing data; a free running counter driven to count up at constant intervals; compare registers whose contents are compared with the content of the free running counter; comparators for comparing the state of the free running counter with the content of the compare registers and, at the time of a match therebetween, for generating an interruption; latch circuits, controlled by the CPU, for storing either an on-signal or an off-signal with respect to each of a plurality of output terminals and for outputting the stored signal through each of the output terminals, the contents of the latch circuits being updated upon generation of the interruption; a first pulse generating arrangement, including the compare registers, the comparators and the latch circuits; a second pulse generating arrangement, including the compare registers, the comparators and the latch circuits; and at least three gates, each connected to the first and the second pulse generating arrangement, the gates externally outputting pulse signals based on the signals from the two pulse generating arrangement.

The control processor incorporating the microcomputer of the above constitution uses a program that realizes virtual timer outputs so as to vary the number of timer outputs flexibly. This makes it possible for the control processor with its single microcomputer to control any vehicles having four to twelve or more cylinders.

BRIEF DESCRIPTION OF THE DRAWINGS

FIG. 15 is a table listing typical settings of virtual OCR output times and output patterns (first example);

FIG. 23 is a flowchart of virtual OCR update processing (second example);

FIG. 24 is a table listing typical settings of virtual OCR output times and output patterns (second example);

FIG. 25 is a flowchart of OCR1 update processing (second example);

FIG. 26 is a block diagram of an output pattern generating circuit (third example);

FIG. 27 is a truth table of an RS flip-flop circuit;

DESCRIPTION OF THE PREFERRED EMBODIMENTS

Figure 1:
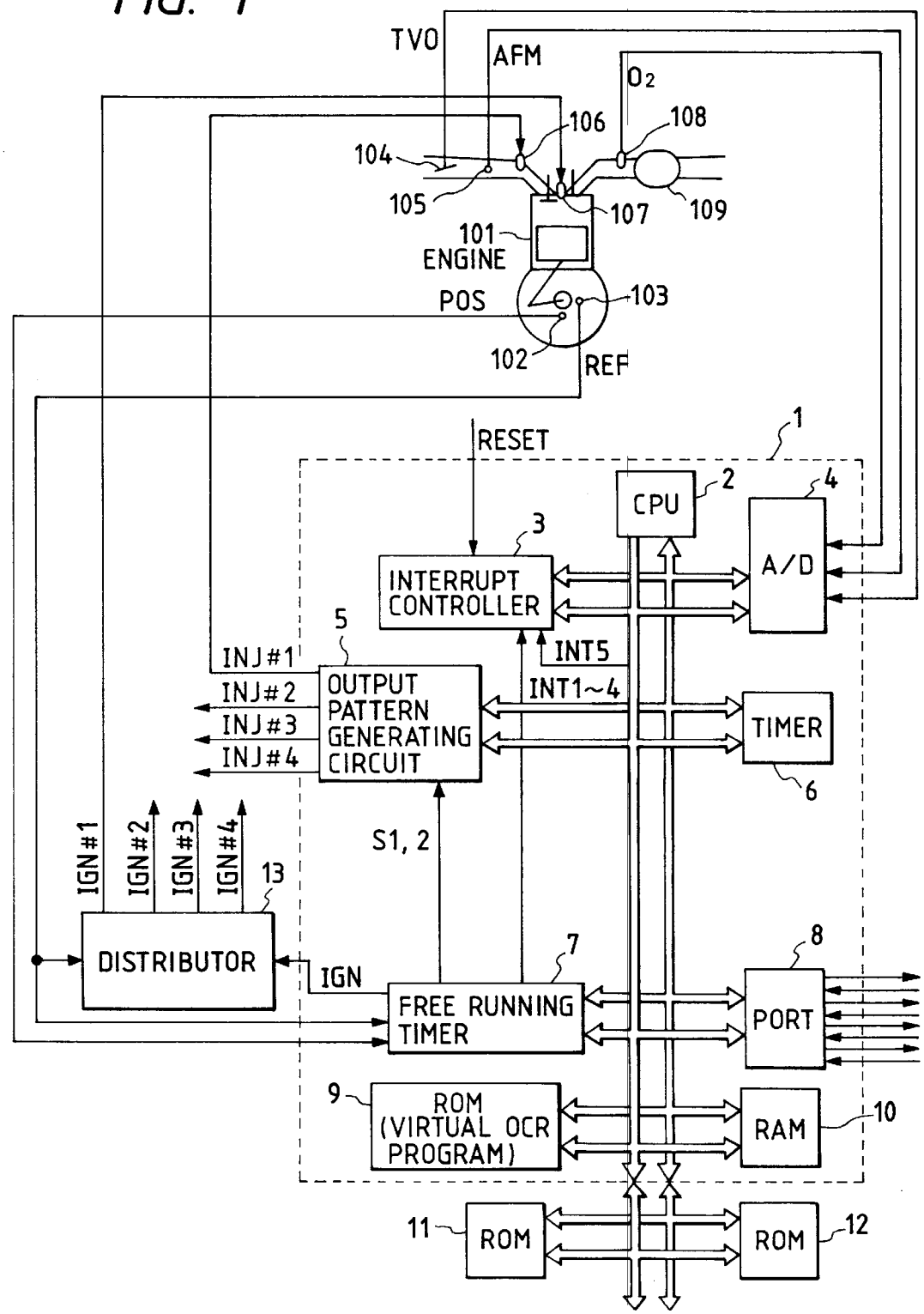
FIG. 1 is a block diagram of the hardware constitution of an automotive engine control system to which the present invention is applied.

Preferred embodiments of the present invention will now be described with reference to the accompanying drawings. In describing the embodiments, like reference characters designate like or corresponding parts, and their descriptions are curtailed or omitted where redundant.

A typical hardware constitution of the engine control system embodying the invention will now be described with reference to FIGS. 1 through 17.

FIG. 1 is a block diagram of the hardware constitution of an automotive engine control system to which the present invention is applied. The engine for use with this automotive engine control system is assumed to be a four-cylinder four-cycle engine 101. The sensors of the system include: TVO sensors 104 for detecting throttle opening; AFM sensors 105 for detecting the quantity of inlet air; 02 sensors 108 for detecting the amount of oxygen contained in exhaust gas; REF sensors 103 for generating pulses at intervals of a crank angle of 180 degrees in the engine 101; and POS sensors 102 for generating pulses at intervals of a crank angle of 2 degrees. The pulse signals from the REF sensors 103 vary in pulse width from cylinder to cylinder. Each cylinder may be identified by use of the pulse width data.

Mechanisms for controlling the engine 101 include injectors INJ 106 for injecting fuel into the cylinders and ignition plugs IGN 107 for igniting the mixture of air and fuel in the cylinders. One injector INJ and one ignition plug IGN are furnished for each cylinder and they, as well as other parts functionally common to one another across the cylinders, may be represented by one of them where appropriate for the purpose of simplification of illustration. A catalyzer 109 is provided to purify exhaust fumes. A single-chip microcomputer 1 for controlling the engine 101 comprises: a CPU 2 for operation processing; analog-digital converter 4 for converting analog signals to digital format; port 8 for inputting and outputting digital signals; a ROM 9 for storing a control program and a virtual OCR program for virtually expanding timer outputs; a RAM 10 for temporarily storing data; a timer 6 for generating interruptions at constant intervals; an interrupt controller 3; a free running timer 7 for inputting and outputting pulse signals; and an output pattern generating circuit 5 operating in keeping with the free running timer 7.

Figure 2:
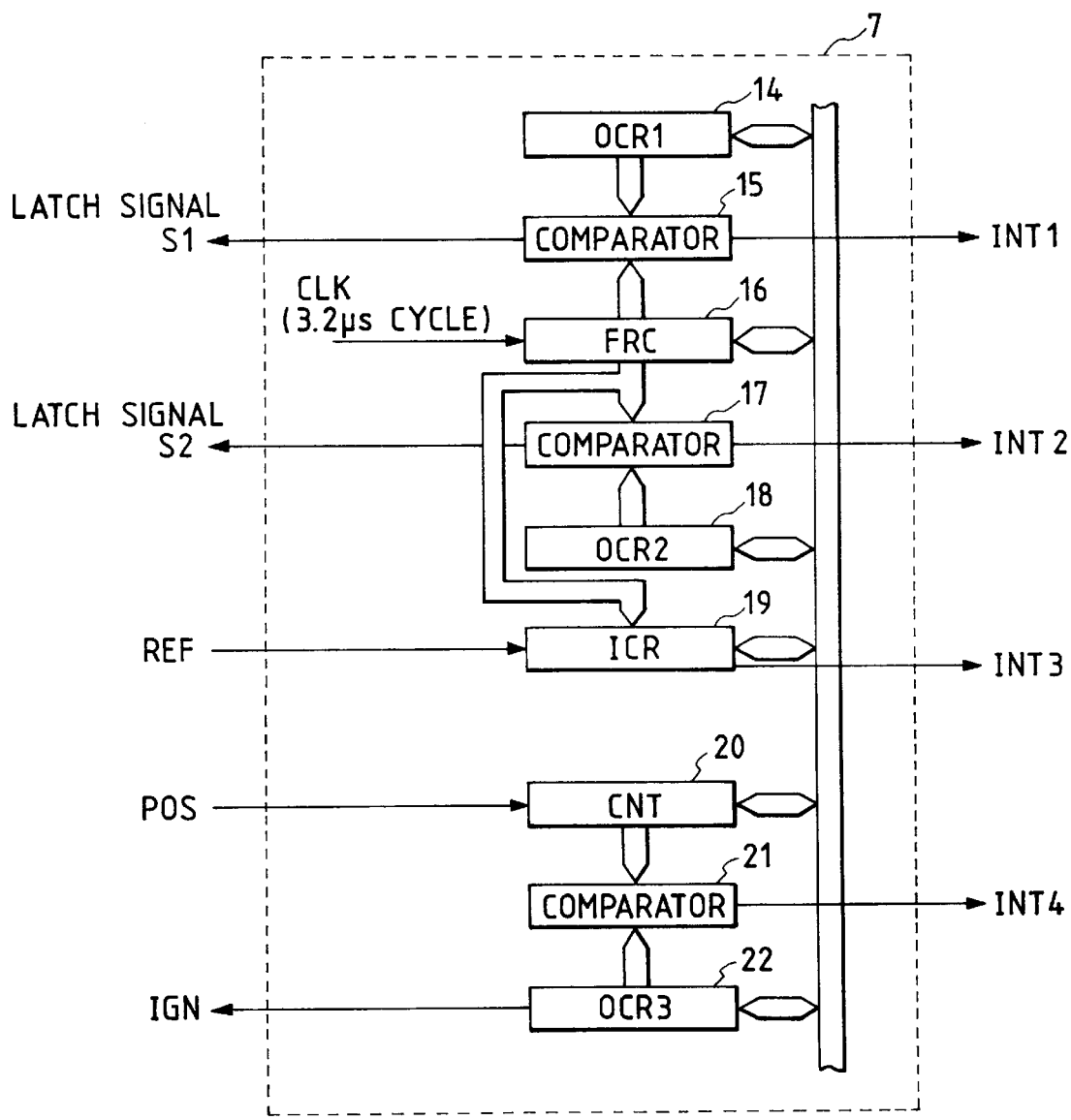
FIG. 2 is a block diagram of a free running timer (first example)

FIG. 2 is a detailed block diagram of the free running timer 7. An FRC 16 (free running counter) in the timer 7 is counted up at constant intervals of about 3.2 μs based on an internal clock signal CLK. A comparator 15 generates a latch signal S1 and an interrupt signal INT1 when the data of an output compare register 14 (OCR1) becomes equal to the state of the FRC 16. Likewise, a comparator 17 generates a latch signal S2 and an interrupt signal INT2 when the data of an output compare register 18 (OCR2) becomes equal to the state of the FRC 16. At a leading edge of a pulse signal REF from an REF sensor 103, an input capture register ICR19 captures the count of the FRC 16 and generates an interrupt signal INT3 accordingly. A counter CNT 20 is counted up at each leading edge of a pulse signal POS from a POS sensor 102.

A comparator 21 generates an interrupt signal INT4 when the data of an output compare register 22 (OCR3) becomes equal to the count of the CNT 20.

Figure 3:
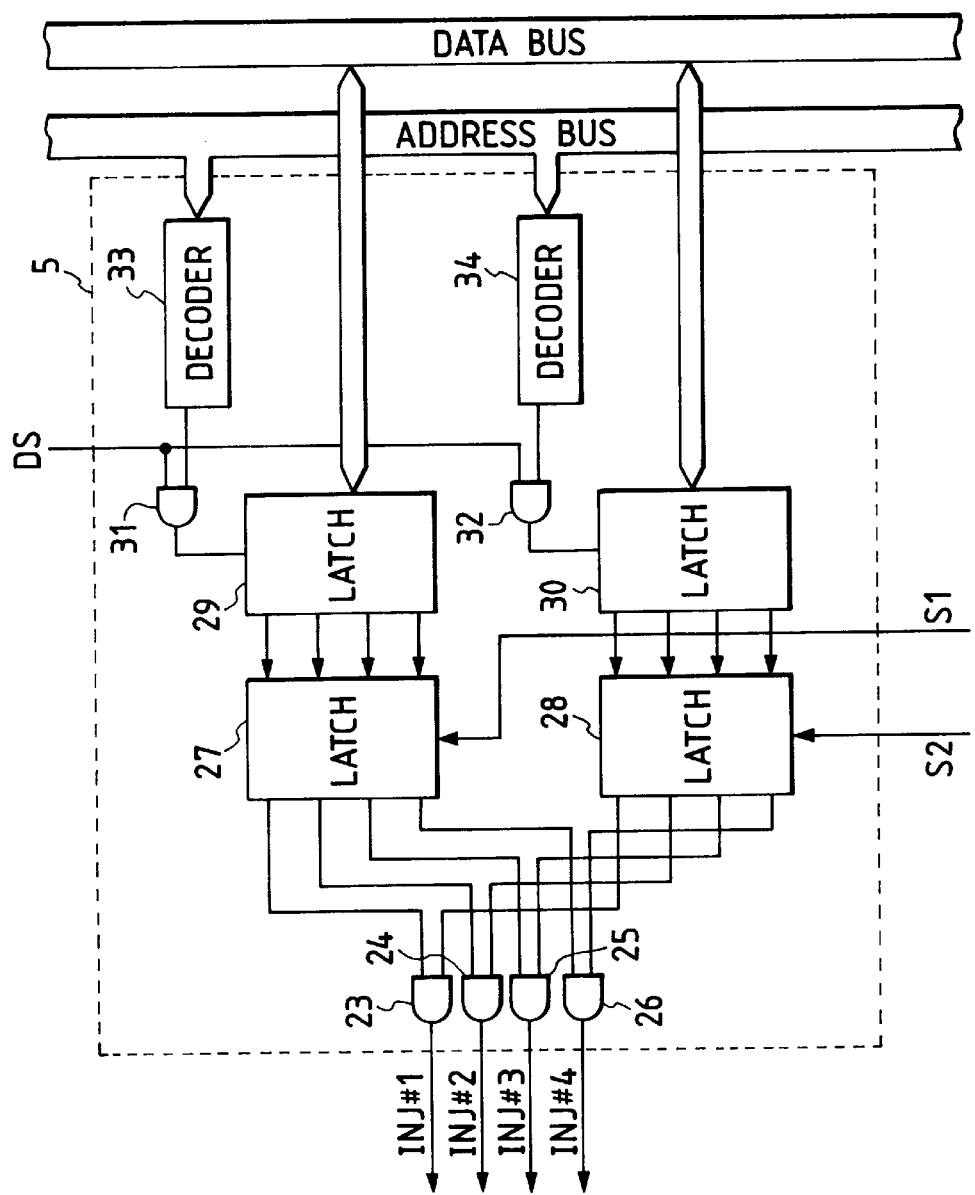
FIG. 3 is a block diagram of an output pattern generating circuit (first example)

FIG. 3 is a detailed block diagram of the output pattern generating circuit 5. A latch circuit 29 receives data from a data bus using the timing of an AND gate 31 that ANDs two signals: a chip select (CS) signal obtained by a decoder 33 decoding an address signal, and a data strobe (DS) signal indicating that the data is effective. Likewise, a latch circuit 30 receives data from the data bus using the timing of an AND gate 32 that ANDs two signals: a chip select (CS) signal acquired by a decoder 34 decoding the address signal, and the data strobe signal indicating that the data is effective. A latch circuit 27 receives the output of the latch circuit 29 based on the timing of the latch signal S1 from the free running timer 7. Similarly, a latch circuit 28 receives the output of the latch circuit 30 using the timing of the latch signal S2 from the free running timer 7. It follows that if the latch circuits 29 and 30 store predetermined output patterns, a desired output pattern may be output automatically when the value of the FRC 16 becomes equal to that of the output compare register 14 (OCR1) or that of the output compare register 18 (OCR2). AND gates 23, 24, 25 and 26 are used to AND the outputs of the latch circuits 27 and 28. Illustratively, where the latch circuits 27 and 28 are used to effect, respectively, the rise and the decay of pulse signals, it is possible to generate all signal patterns required to produce fuel injection signals.

Figure 4:
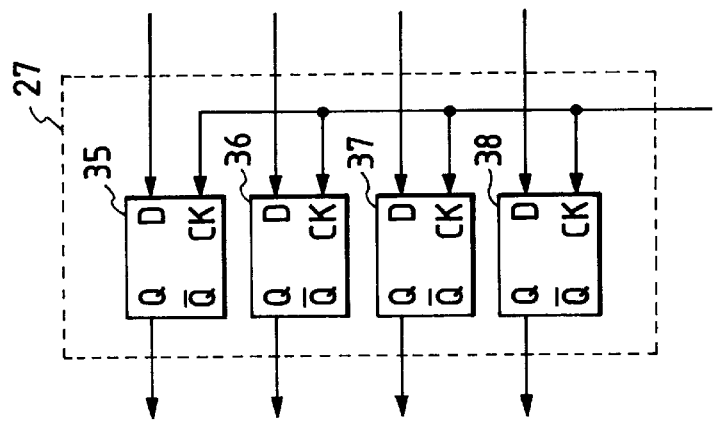
FIG. 4 is a block diagram of a latch circuit.

FIG. 4 is a block diagram of a specific latch circuit representing the latch circuits 27, 28, 29 and 30. This latch circuit is composed of D type flip-flop circuits 35, 36, 37 and 38. An input D appears at an output Q when a leading edge of the clock (CK) signal is encountered. Since this embodiment presupposes the use of a four-cylinder engine, four D type flip-flop circuits are provided. If the engine has, say, 12 cylinders, 12 D type flip-flop circuits should preferably be furnished so as to output all necessary fuel injection signals.

The foregoing description has primarily dealt with the hardware aspect of the invention. What follows is a description of how the engine is controlled by the method of the invention.

Figure 5:
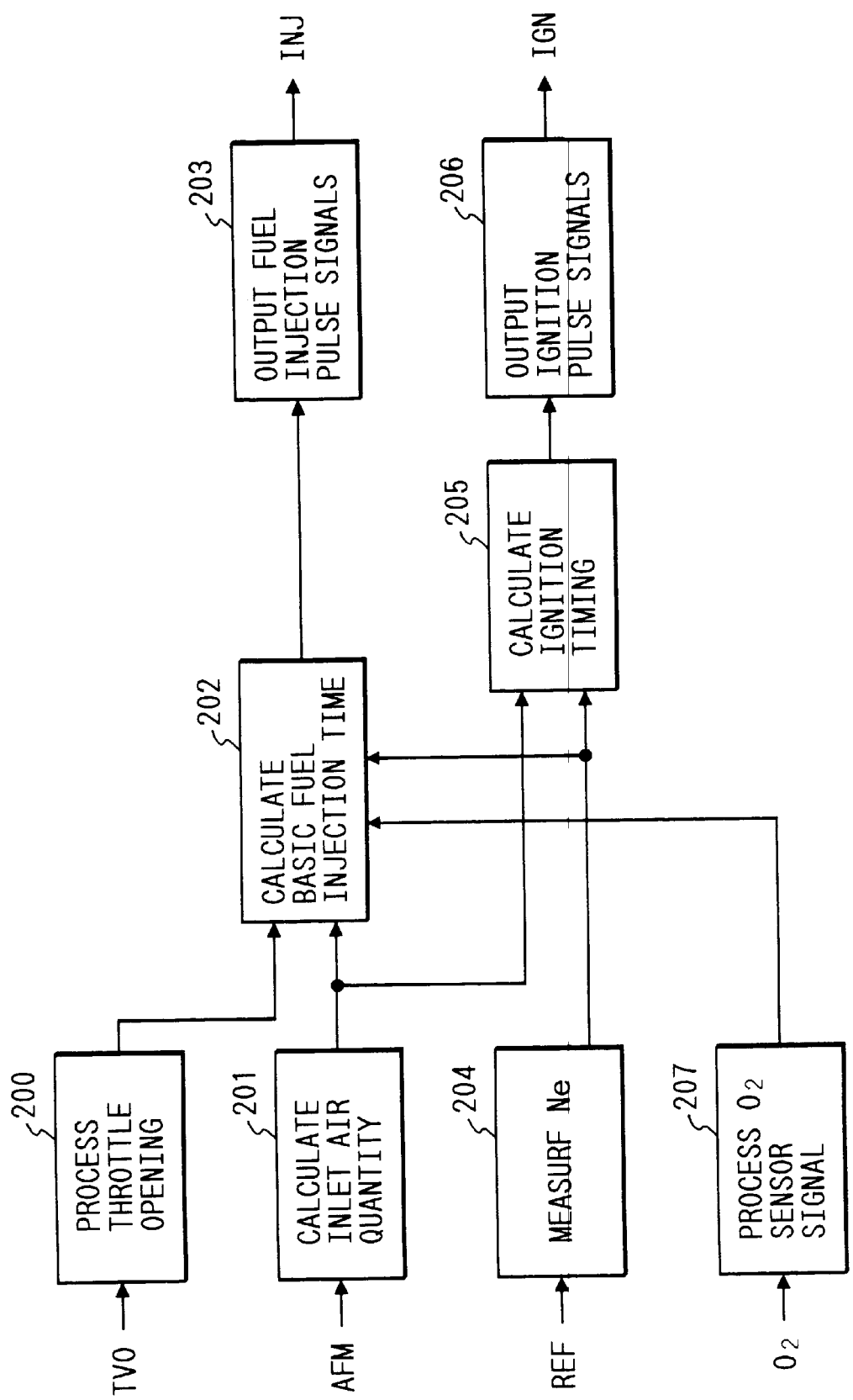
FIG. 5 is a functional block diagram of engine control.

FIG. 5 is a functional block diagram of the engine control according to the invention. A pulse signal synchronized with the engine revolutions is obtained by the REF sensor 103 and sent to a block 204. Using the pulse signal, the block 204 measures the pulse frequency so as to calculate an engine rotational frequency Ne. A signal from the air flow rate sensor 105 is converted in coefficient by a block 201 that calculates an air inlet quantity Qa. These values are sent to a block 202 which in turn calculates a basic fuel injection quantity TI using the following expression:

$$TI = K \cdot Qa/Ne + Ts \quad (1)$$

where, K is a corrective coefficient and Ts is an invalid pulse width.

A fuel injection timing TITM is determined by the engine rotational frequency Ne. Specifically, the appropriate fuel injection timing is obtained by a search through a timing table or by like means. If the throttle opening is greater by a specific value than the opening acquired by a block 200, corrections may be made, such as an increase in the amount of fuel injection. An $O_2$ sensor signal acquired by a block 207 is used to check if the theoretical air-fuel ratio is complied with. With such data furnished, the fuel injection quantity TI may be controlled so as to perform such feedback control schemes as proportional control and integral control. The basic fuel injection quantity TI and the fuel injection timing TITM obtained in this manner are output from a block 203 in the form of an injection pulse signal.

An ignition signal is generated as follows: the block 201 obtains the quantity of inlet air, and the block 204 acquires the engine rotational frequency Ne. Given these data, a block 205 determines an ignition signal pulse width DWELL and an ignition timing ADV. Specifically, these settings are obtained by a search through a predetermined data table. The ignition signal pulse width DWELL and the ignition timing ADV are output from a block 206 in the form of an ignition pulse signal.

Figure 6:
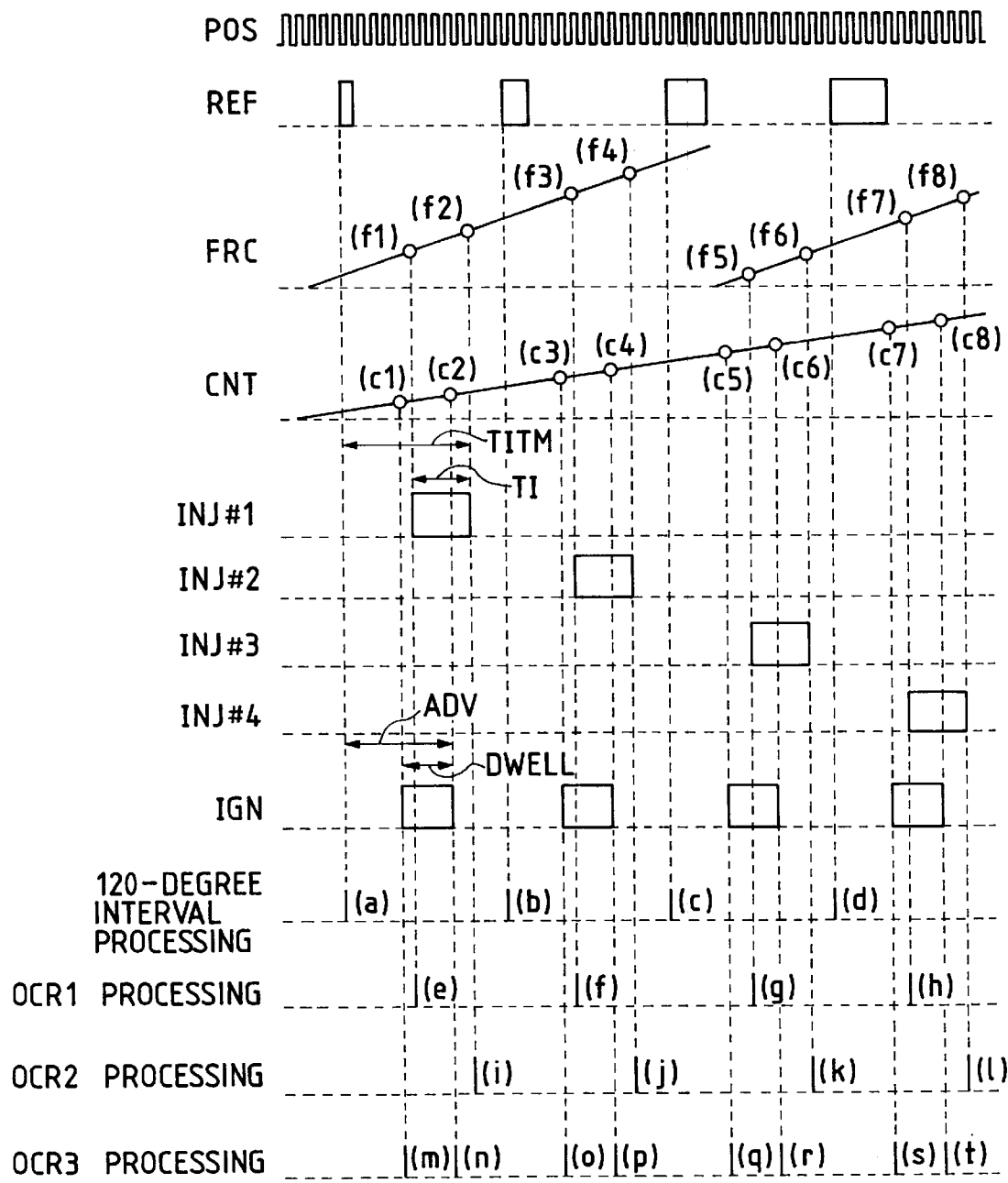
FIG. 6 is a timing chart of signals used for engine control (first example)

FIG. 6 is a timing chart of signals used for engine control. The chart shows, from top down, typical waveforms of the signal from the POS sensor 102, of the signal from the REF sensor 103, of the value of the free running counter FRC, and of the value of the counter CNT counted up at leading edges of the POS sensor signal. The timing chart continues to show, also from top down, output waveforms of a fuel injection signal INJ#1 from the first cylinder, of a fuel injection signal INJ#2 from the second cylinder, of a fuel injection signal INJ#3 from the third cylinder, of a fuel injection signal INJ#4 from the fourth cylinder, and of the ignition signal IGN; as well as timing waveforms for 120-degree interval processing, for OCR1 processing, for OCR2 processing and for OCR3 processing.

In a 120-degree interval process (a), the engine rotational frequency Ne is calculated, and so are the basic fuel injection quantity TI, fuel injection timing TITM, ignition timing ADV and ignition signal pulse width DWELL. With these settings calculated, there are generated fuel injection pulse output times f(1) f(2) f(3) and f(4) as well as the output patterns corresponding to these output times. The output time at which a first rise occurs is set to the OCR1, and the output pattern for the first rise is set to the latch circuit 29. The output time at which a first decay occurs is set to the OCR2, and the output pattern for the first decay is set to the latch circuit 30. Then a rise angle (c1) of the ignition signal IGN is set to the OCR3. When the value of the counter CNT becomes equal to (c1), the ignition signal IGN is raised and a decay angle (c2) is set to the OCR3 simultaneously. When the value of the counter CNT reaches (c2), the ignition signal IGN is lowered as per the decay setting established at the angle (c1). Meanwhile, a rise of the fuel injection signal is automatically output at the time (f1) when the OCR1 reaches a match upon comparison. In an OCR1 process (e), the time (f3) at which the next rise occurs is set to the OCR1, and the output pattern for the next rise is set to the latch circuit 29. A decay of the fuel injection signal is automatically output at the time (f2) when the OCR2 reaches a match upon comparison. In an OCR2 process (i), the time (f4) at which the next decay occurs is set to the OCR1, and the output pattern for the next decay is set to the latch circuit 30.

In connection with the timing chart of FIG. 6, the 120-degree interval process (a) described above is identical in operative terms to 120-degree interval processes (b), (c) and (d); the OCR1 process (e) is identical to OCR1 processes (f), (g) and (h); and the OCR2 process (i) is identical to OCR2 processes (j), (k) and (1).

Various flows of control processing by the automotive engine control system according to the invention will now be described in detail with reference to FIGS. 7 through 17.

Figure 7:
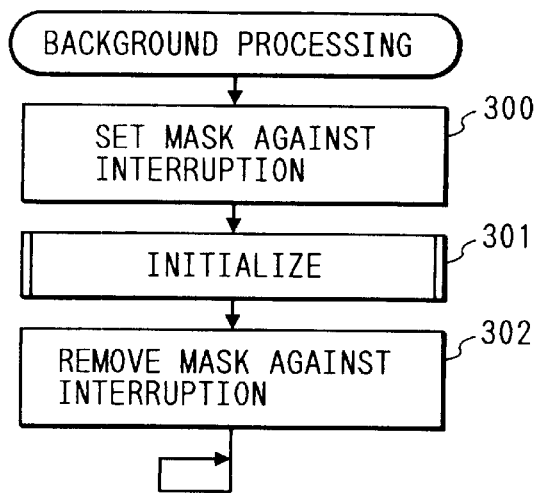
FIG. 7 is a flowchart of steps for background processing.

FIG. 7 is a flowchart of steps constituting a background processing program that acts when the single-chip microcomputer 1 is reset. In step 300, masking is performed to inhibit interruptions. In step 301, initialization is carried out, including that of the RAM 10 and peripheral function registers. In step 302, the mask against interruptions is removed.

Below is a detailed description of tasks each generating a start request interruption at various timings.

Figure 8:
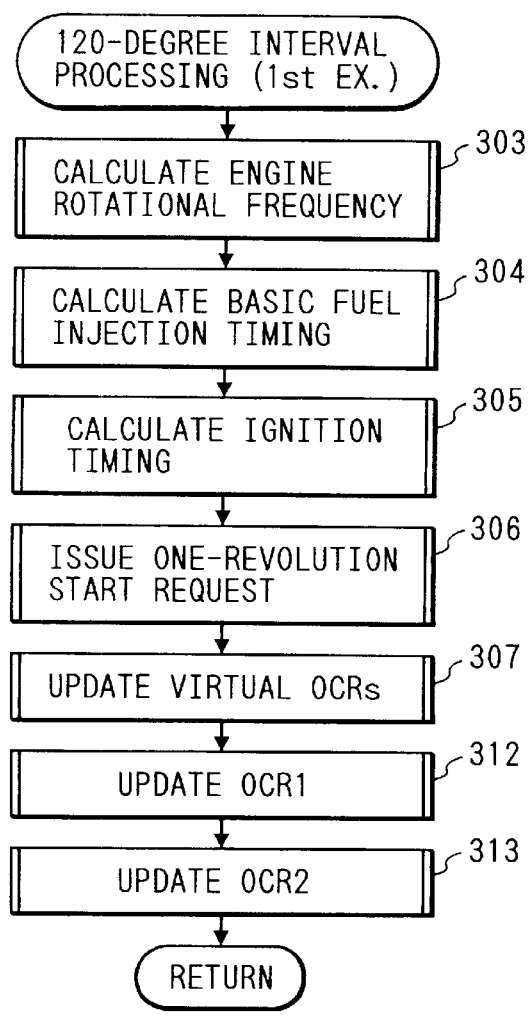
FIG. 8 is a flowchart of 120-degree interval processing (first example)

FIG. 8 is a flowchart of a task that generates a start request at intervals of 120 degrees of crank angle. In step 303, the content of the ICR 19 that stores the rise timing of the REF signal is used to find the pulse cycle of the REF signal. With the pulse cycle obtained, the engine rotational frequency is calculated accordingly. In step 304, the basic fuel injection quantity TI and the fuel injection timing TITM are calculated from such data as the engine rotational frequency and the inlet air quantity. In step 305, the ignition timing is calculated. The calculated time at which the ignition signal should rise is set to the output compare register 22 (OCR3) shown in FIG. 2. In step 306, one revolution of the crank shaft is detected, and a one-revolution start request is issued. In step 307, the target output patterns and the output times thereof are set to the virtual OCRs. In step 312, of the times set in a virtual OCR 1-n updated in step 307, the first time to arrive is set to the hardware OCR1. In step 313, of the times set in a virtual OCR 2-n updated in step 307, the first time to arrive is set to the hardware OCR2.

Figure 9:
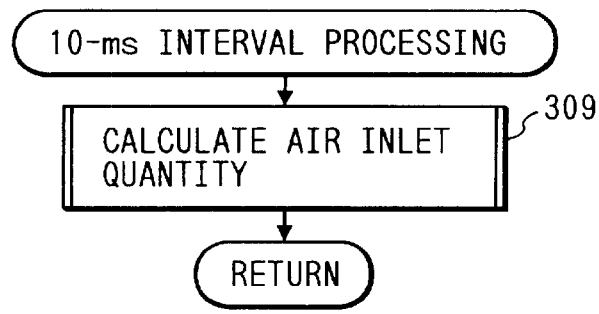
FIG. 9 is a flowchart of 10 ms interval processing.

FIG. 9 is a flowchart of a task that generates a start request at intervals of 10 ms counted by the timer 6. In step 309 of this task, a signal is received from the AFM sensor 105 so as to calculate the quantity of inlet air.

Figure 10:
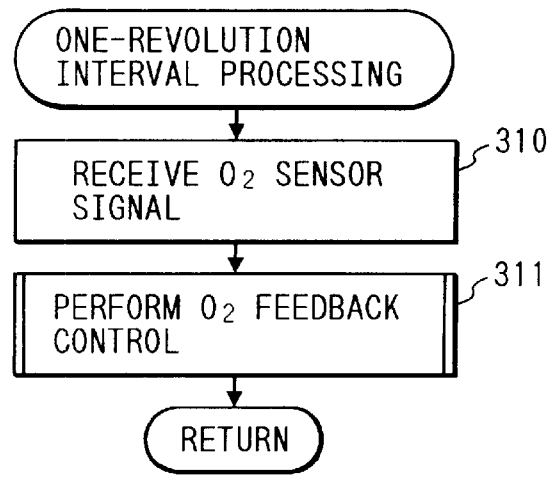
FIG. 10 is a flowchart of one-revolution interval processing.

FIG. 10 is a flowchart of a task that generates a start request at intervals of one revolution of the crank shaft. In step 310, a signal is received from the $0_2$ sensor 108. In step 311, the fuel injection time is prolonged or reduced on the basis of the received $0_2$ sensor signal so that the air-fuel ratio of 14:7 is reached.

Figure 11:
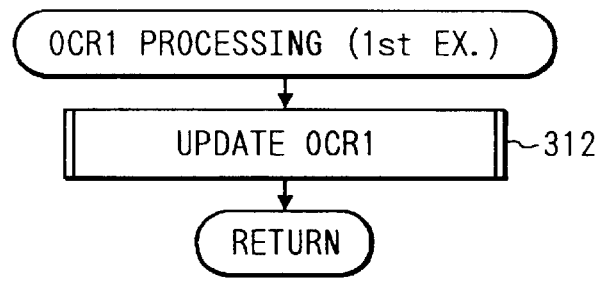
FIG. 11 is a flowchart of OCR1 processing (first example)

FIG. 11 is a flowchart of an OCR1 start request task. In step 312 of this task, the OCR1 is updated.

Figure 12:
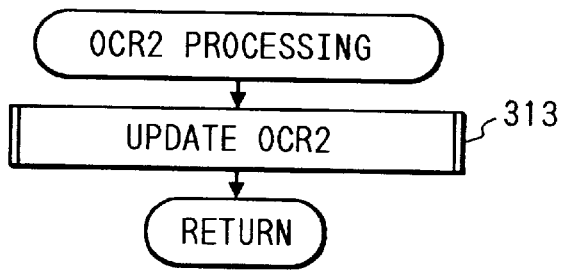
FIG. 12 is a flowchart of OCR2 processing (first example)

FIG. 12 is a flowchart of an OCR2 start request task. In step 313 of this task, the OCR2 is updated.

Figure 13:
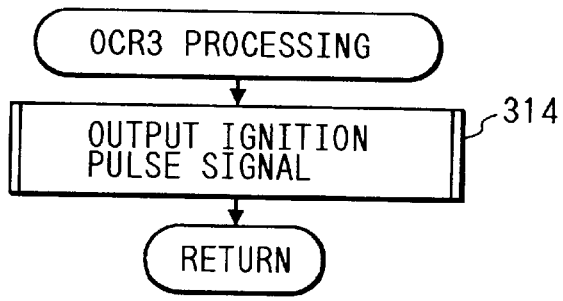
FIG. 13 is a flowchart of OCR3 processing.

FIG. 13 is a flowchart of an OCR3 start request task. In step 314 of this task, the decay angle of the ignition pulse signal is set to the OCR3.

The updating of the virtual OCRs in step 307, the updating of the OCR1 in step 312, and the updating of the OCR2 in step 313 are particularly characteristic of this invention. These processes will be further described below with reference to more detailed flowcharts.

Figure 14:
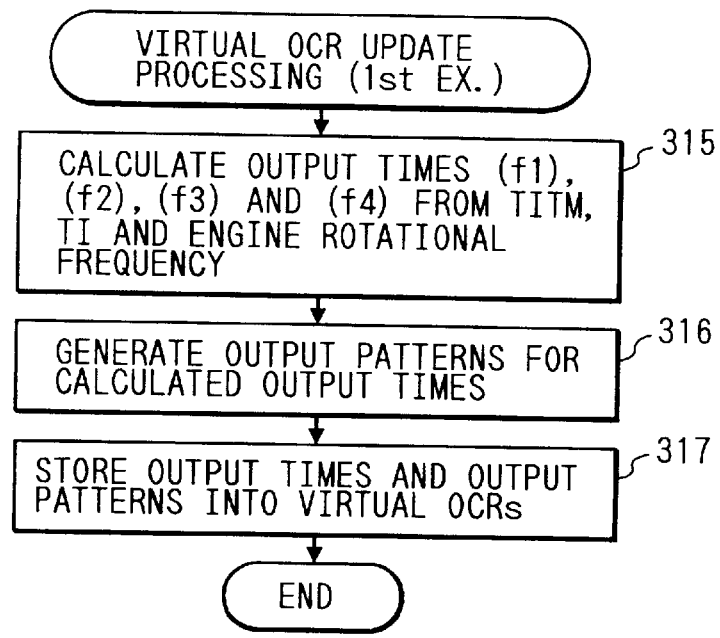
FIG. 14 is a flowchart of virtual OCR update processing (first example)

FIG. 14 is a flowchart of virtual OCR update processing. The update processing described here is that in effect for the timing of the 120-degree interval process (a) described in conjunction with FIG. 6. In step 315 of FIG. 14, the output times (f1), (f2), (f3) and (f4) are calculated from the basic fuel injection quantity TI and fuel injection timing TITM acquired in step 304. In step 316, the output pattern for each of the calculated output times is generated. In step 317, the output times and output patterns thus obtained are stored into virtual OCRs.

The results of the steps above are summarized in FIG. 15. The output times for the timings of the 120-degree interval processes (a), (b), (c) and (d) and the output patterns corresponding to these times take on the values listed.

Figure 16:
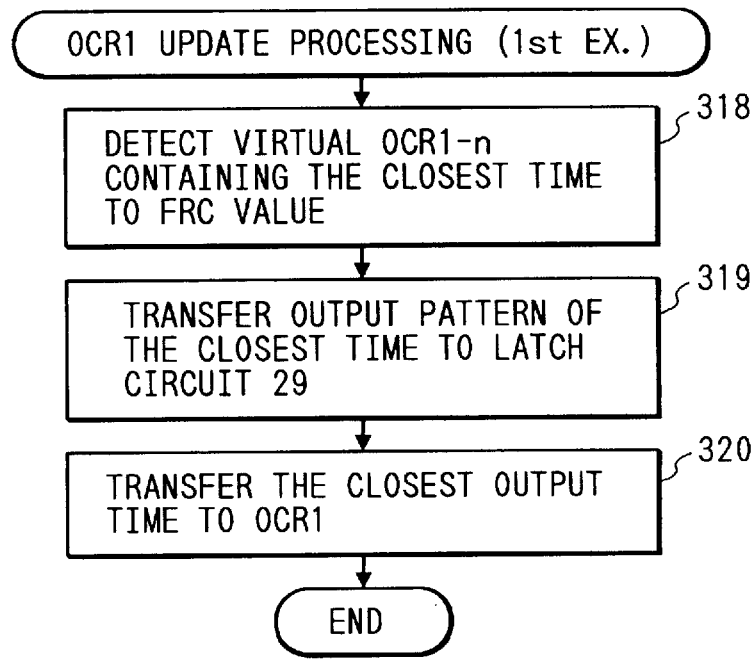
FIG. 16 is a detailed flowchart of OCR1 update processing (first example)

FIG. 16 is a flowchart of OCR1 update processing. In step 318, the virtual OCR 1-n whose content is to be output first is detected. For the timing of the 120-degree interval process (a), the output time is (f1). In step 319, the output pattern to be output first is transferred to the latch circuit 29. For the timing of the 120-degree interval process (a), the output pattern is 0001. In step 320, the output time (f1) which was detected in step 318 and at which the first output is to be effected is transferred to the output compare register 14 (OCR1). This allows the latch circuit 27 automatically to output the output pattern 0001 at the output time (f1).

Figure 17:
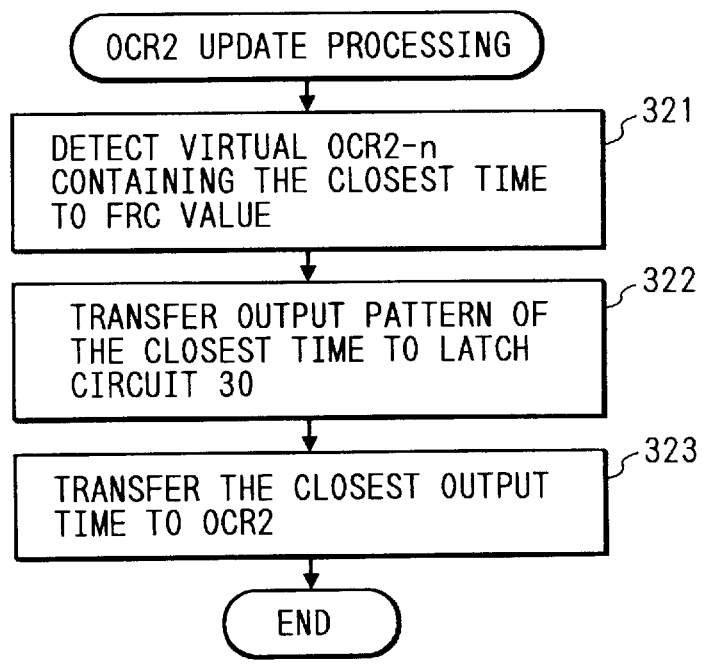
FIG. 17 is a detailed flowchart of OCR2 update processing (first example)

FIG. 17 is a flowchart of OCR2 update processing. In step 321, the virtual OCR 2-n whose content is to be output first is detected. For the timing of the 120-degree interval process (a), the output time is (f2). In step 322, the output pattern to be output first is transferred to the latch circuit 30. For the timing of the 120-degree interval process (a), the output pattern is 1110. In step 323, the output time (f2) which was detected in step 321 and at which the first output is to be effected is transferred to the output compare register 18 (OCR2). This allows the latch circuit 28 automatically to output the output pattern 1110 at the output time (f2). Because the output pattern of the latch circuit 27 is 0001 and that of the latch circuit 28 is 1110 at the output time (f2), all outputs of the fuel injection signals INJ#1, INJ#2, INJ#3 and INJ#4 become 0 and thus fuel injection is stopped.

The processing above allows only one FRC and two OCRs to output necessary engine fuel injection signals. This translates into a simplified hardware constitution of the single-chip microcomputer. When the virtual OCR program is altered appropriately, the microcomputer of the same specifications can control any other engine having a different number of cylinders.

The updating of the virtual OCRs and that of the OCRn should preferably take 3.2 μs or less to be achieved because the input μs clock cycle for the free running counter 16 is 3.2 μs. For example, the updating of the virtual OCRs involves about 64 steps. This means that the clock frequency of the microcomputer should preferably be 20 MHz or higher.

Below is a description of further simplified examples of the output pattern generating circuit 5 and of the free running timer 7.

Figure 18:
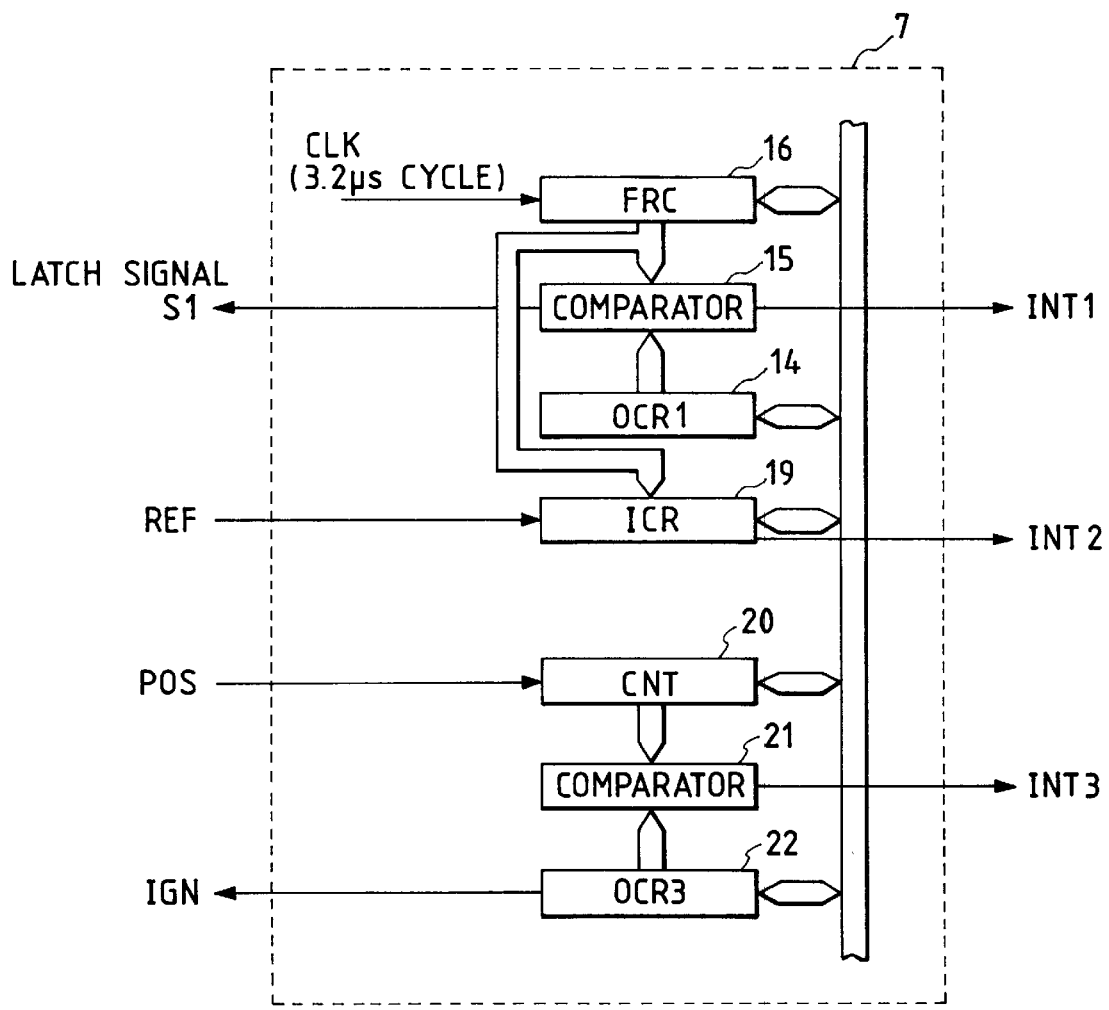
FIG. 18 is a block diagram of a free running timer (second example)
Figure 19:
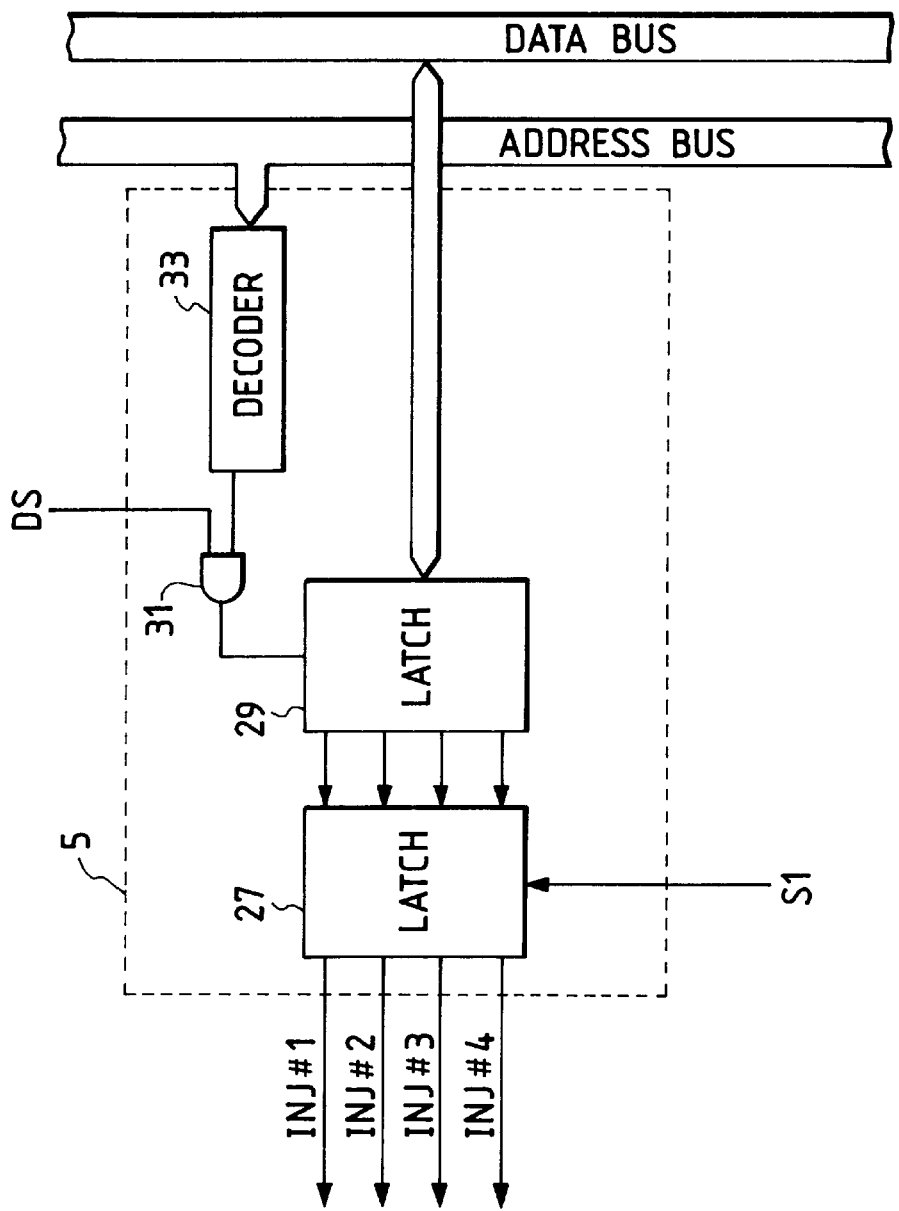
FIG. 19 is a block diagram of an output pattern generating circuit (second example)

FIG. 18 is a block diagram of a simplified free running timer 7. Compared with the structure shown in FIG. 2, this free running timer 7 does not include the output compare register 18 (OCR2) and comparator 17. FIG. 19 is a detailed block diagram of a simplified output pattern generating circuit 5. Compared with what is shown in FIG. 3, this output pattern generating circuit 5 does not include the output pattern generating parts constituting one channel, as well as the AND gates 23, 24, 25 and 26. With these structures, four pulse outputs are controlled using the time settings in one output compare register 14 (OCR1).

Figure 20:
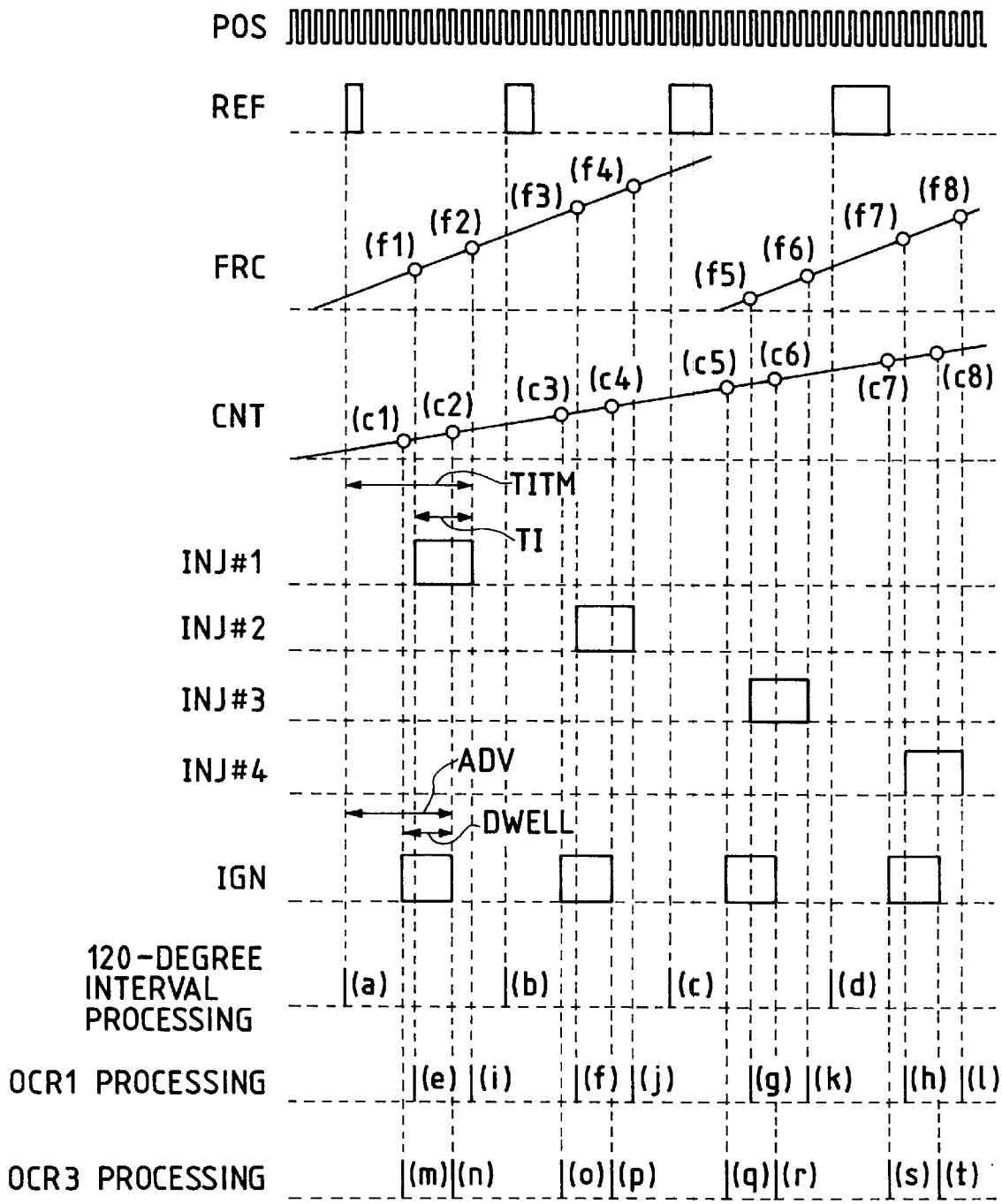
FIG. 20 is a timing chart of signals used for engine control (second example)

FIG. 20 is a timing chart of signals used for engine control. The timing chart shows, from top down, typical waveforms of the signal from the POS sensor 102, of the signal from the REF sensor 103, of the value of the free running counter FRC, and of the value of the counter CNT counted up at leading edges of the POS sensor signal. The chart continues to show, also from top down, output waveforms of the fuel injection signal INJ#1 from the first cylinder, of the fuel injection signal INJ#2 from the second cylinder, of the fuel injection signal INJ#3 from the third cylinder, of the fuel injection signal INJ#4 from the fourth cylinder, and of the ignition signal IGN; as well as timing waveforms for 120-degree interval processing, for OCR1 processing and for OCR3 processing.

In the 120-degree interval process (a), the engine rotational frequency Ne is calculated, and so are the basic fuel injection quantity TI, fuel injection timing TITM, ignition timing ADV and ignition signal pulse width DWELL. With these settings calculated, there are generated fuel injection pulse output times f(1) f(2) f(3) and f(4) as well as the output patterns corresponding to these output times. The output time at which a first rise occurs is set to the OCR1, and the output pattern for the first rise is set to the latch circuit 29. Then, the rise angle (c1) of the ignition signal IGN is set to the OCR3. When the value of the counter CNT becomes equal to (c1), the ignition signal IGN is raised and the decay angle (c2) is set to the OCR3 simultaneously. When the value of the counter CNT reaches (c2), the ignition signal IGN is lowered as per the decay setting established at the angle (c1). Meanwhile, a rise of the fuel injection signal is automatically output at the time (f1) when the OCR1 reaches a match upon comparison. In the OCR1 process (e), the time (f2) at which the next decay occurs is set to the OCR1, and the output pattern for the next decay is set to the latch circuit 29. The decay time (f2) corresponds to the OCR1 process (i) in which the next rise time (f3) is set to the OCR1, and the output pattern for the next rise is also set correspondingly.

In connection with the timing chart of FIG. 20, the 120-degree interval process (a) described above is identical in operative terms to 120-degree interval processes (b), (c) and (d); the OCR1 process (e) is identical to OCR1 processes (f), (g) and (h); and the OCR1 process (i) is identical to OCR1 processes (j), (k) and (1).

Several flows of control processing by the automotive engine control system using the above-described hardware will now be described in detail with reference to FIGS. 21 through 25.

Figure 21:
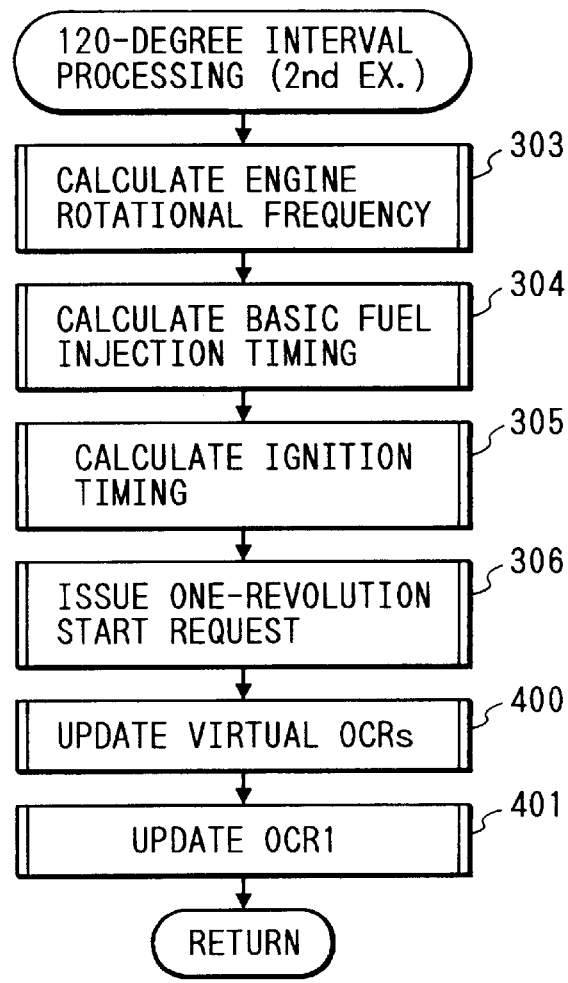
FIG. 21 is a flowchart of 120-degree interval processing (second example)

FIG. 21 is a flowchart of a task that generates a start request at intervals of 120 degrees of crank angle. In step 303, the content of the ICR 17 that stores the rise timing of the REF signal is used to find the pulse cycle of the REF signal. With the pulse cycle obtained, the engine rotational frequency is calculated accordingly. In step 304, the basic fuel injection quantity TI and the fuel injection timing TITM are calculated from such data as the engine rotational frequency and the inlet air quantity. In step 305, the ignition timing is calculated. The calculated time at which the ignition signal should rise is set to the output compare register 22 (OCR3 ) shown in FIG. 2. In step 306, one revolution of the crank shaft is detected, and a one-revolution start request is issued. In step 400, the target output patterns and the output times thereof are set to virtual OCRs. In step 401, of the times set in the virtual OCRs in step 307, the first time to arrive is set to the hardware OCR1. The output pattern for that time is set to the latch circuit 29.

Figure 22:
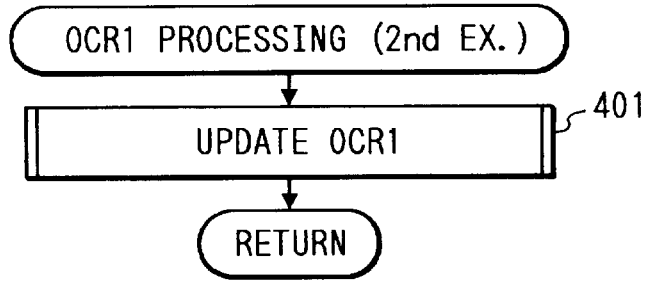
FIG. 22 is a flowchart of OCR1 processing (second example)

FIG. 22 is a flowchart of an OCR1 start request task. In step 401 of this task, the OCR1 is updated.

As mentioned earlier, FIG. 13 is a flowchart of the OCR3 start request task. In step 314 of this task, the decay angle of the ignition pulse signal is set to the OCR3.

The updating of the virtual OCRs in step 400 and updating of the OCR1 in step 401 are particularly characteristic of this invention. These processes will be further described below with reference to more detailed flowcharts.

FIG. 23 is a flowchart of virtual OCR update processing. The update processing described here is that in effect for the timing of the 120-degree interval process(a) described in conjunction with FIG. 20. In step 402 of FIG. 23, the output times (f1), (f2), (f3) and (f4) are calculated from the basic fuel injection quantity TI and fuel injection timing TITM acquired in step 304. In step 403, the output pattern for each of the calculated output times is generated. In step 404, the output times and output patterns thus obtained are stored into virtual OCRs.

The results of the steps above are summarized in FIG. 24. The output times for the timings of the 120-degree interval processes (a), (b), (c) and (d) and the output patterns corresponding to these times take on the values listed.

FIG. 25 is a flowchart of OCR1 update processing. In step 405, the virtual OCR 1-n whose content is to be output first is detected. For the timing of the 120-degree interval process (a), the output time is (f1). In step 406, the output pattern to be output first is transferred to the latch circuit 29. For the timing of the 120-degree interval process (a), the output pattern is 0001. In step 407, the output time (f1) which was detected in step 405 and at which the first output is to be effected is transferred to the output compare register 14 (OCR1). This allows the latch circuit 27 automatically to output the output pattern 0001 at the output time (f1).

The processing above allows only one FRC and one OCR to output necessary engine fuel injection signals. This translates into a yet more simplified hardware constitution of the single-chip microcomputer. When the virtual OCR program is altered appropriately, the microcomputer of the same specifications can control any other engine having a different number of cylinders.

Yet another way of implementing the output pattern generating circuit 5 will now be described. Referring to FIG.

26, when the comparator 15 detects a match of data, the output signal of the latch circuit 29 that effects the rise of the fuel injection signals is output to the set terminals of RS flip-flop circuits 47, 48, 49 and 50 via AND gates 39, 40, 41 and 42. When the comparator 17 detects a match of data, the output signal of the latch circuit 30 that effects the decay of the fuel injection signals is output to the reset terminals of the RS flip-flop circuits 47, 48, 49 and 50 via AND gates 43, 44, 45 and 46.

FIG. 27 is a truth table of an RS flip-flop circuit representing the RS flip-flop circuits 47, 48, 49 and 50. As understood from the truth table, the fuel injection signals INJ#1, INJ#2, INJ#3 and INJ#4 are each set to 1 when the corresponding output from the latch circuit 29 is 1 at the time of a data match on the comparator 15; and the fuel injection signals INJ#1, INJ#2, INJ#3 and INJ#4 are each reset to 0 when the corresponding output from the latch circuit 30 is 1 at the time of a data match on the comparator 17. The above constitution significantly simplifies the output pattern generating circuit and reduces the burden on the processing by software.

Figure 28:
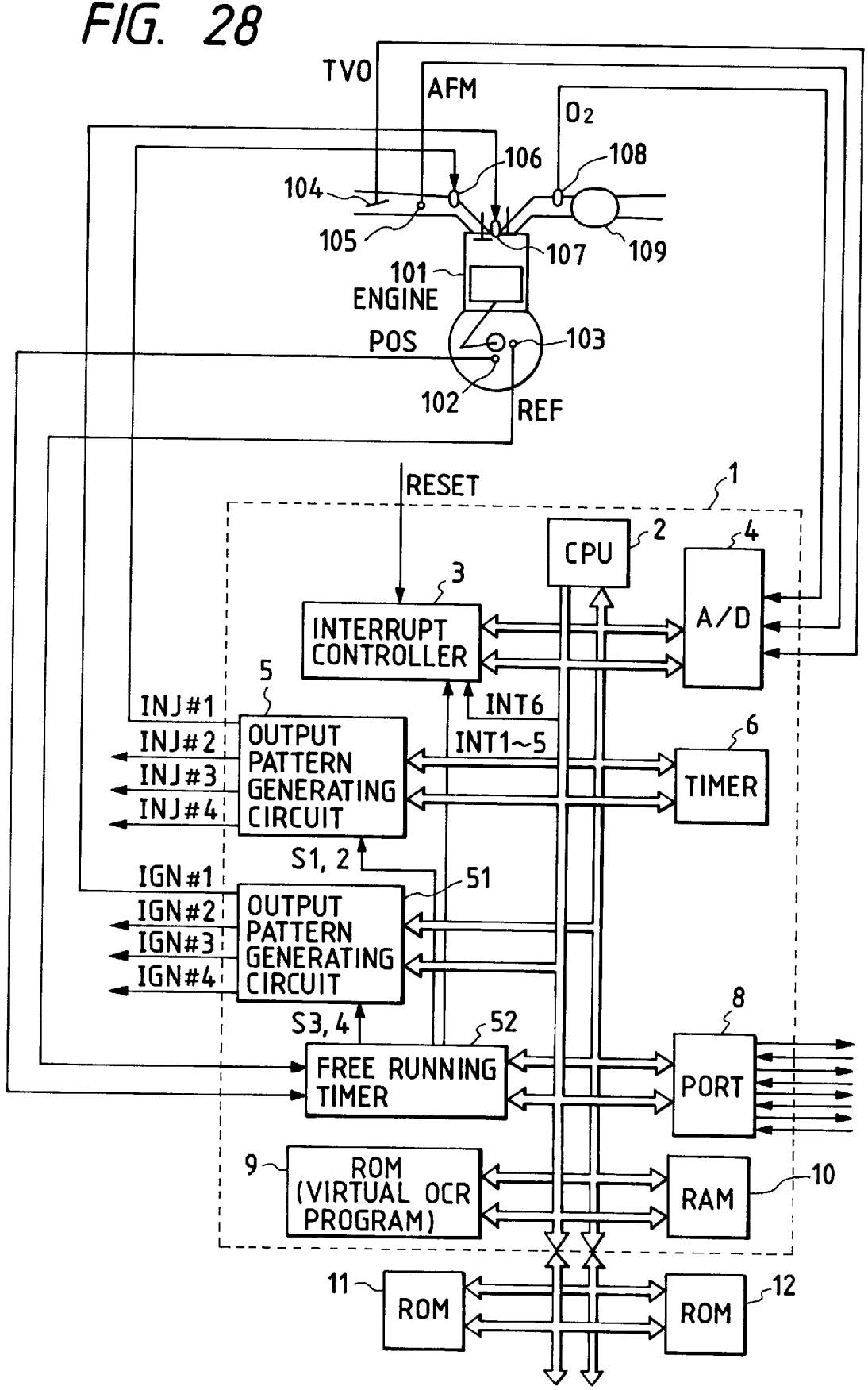
FIG. 28 is a block diagram of the hardware constitution of an automotive engine control system (second example)
Figure 29:
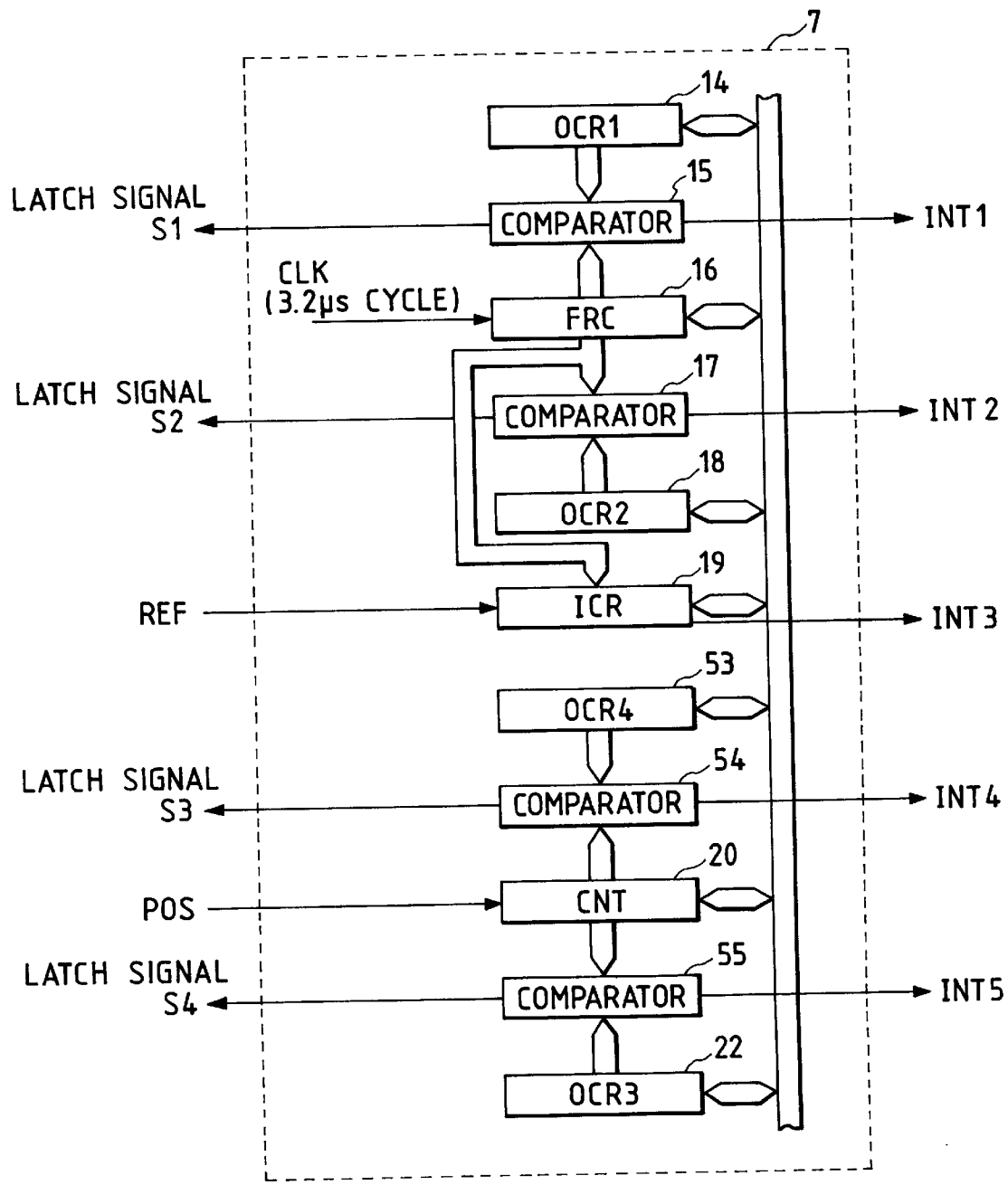
FIG. 29 is a block diagram of a free running timer (third example).

Below is an example of how this invention is applied to a single-chip microcomputer for outputting the ignition signals IGN#1, IGN#2, IGN#3 and IGN#4. FIG. 28 is a block diagram outlining the hardware constitution of an automotive engine control system whose ignition signal output section embodies the invention. This hardware constitution is a variation of what is shown in FIG. 1, with an output pattern generating circuit 51 added anew and the free running timer 52 improved. It should be noted that the output pattern generating circuit 51 may be any one of those depicted in FIGS. 3, 19 and 26. FIG. 29 is a block diagram of the improved free running timer 52. This free running timer has an output compare register 53 (OCR4) and a comparator 54 added anew, and is structurally identical to its counterpart for the fuel injection signal output section. Because the hardware constitution is the same as that of the fuel injection signal output section, the necessary program contents remain the same, and will not be discussed further.

The scheme above allows only one counter CNT and two OCRs to output required engine ignition signals. This translates into an appreciably simplified hardware constitution of the single-chip microcomputer. When the virtual OCR program is altered appropriately, the microcomputer of the same specifications can control any other engine having a different number of cylinders.

As described, the single-chip microcomputer according to the invention is capable of handling many pulse signal outputs and of implementing a wide range of pulse output peripheral functions with a high degree of freedom. The expanded features of the invention are available as a whole at significantly reduced costs. Illustratively, the invention is adapted advantageously to a control processor for an overall automotive engine control system involving a large number of pulse signal outputs.

As many apparently different embodiments of this invention may be made without departing from the spirit and scope thereof, it is to be understood that the invention is not limited to the specific embodiments thereof except as defined in the appended claims.

What is claimed is:

1. A single-chip microcomputer, comprising:
   a CPU for operation processing and internal control;
   a free running counter driven to count up at constant intervals;
   compare registers for holding contents to be compared with the count of said free running counter;
   comparators each of which compares the count of said free running counter with the content of a respective one of said compare registers and, at the time of a match therebetween, generates a timing signal;
   a first timing signal generating arrangement, including ones of said compare registers and of said comparators;
   a second timing signal generating arrangement, including ones of said compare registers and of said comparators; and
   two latch circuits, each connected to a respective one of said first and second timing signal generating arrangements, for storing either an on-signal or an off-signal with respect to each of a plurality of output terminals,
   wherein said two latch circuits output the signals stored therein through respective ones of said plurality of output terminals at the timing of receiving a signal from said first timing signal generating arrangement or said second timing signal generating arrangement connected thereto.

2. A single-chip microcomputer according to claim 1, further comprising at least one unit of said first timing signal generating arrangement, at least one unit of said second timing signal generating arrangement, and at least one unit of said latch circuits.

3. A single-chip microcomputer according to claim 1, wherein said first timing signal generating arrangement and said second timing signal generating arrangement respectively effect the rise and the decay of pulse signals to be outputted externally.

4. A single-chip microcomputer according to claim 1, further comprising an arrangement for generating a clock signal at a frequency of at least 20 MHz.

5. A single-chip microcomputer, comprising:
   a CPU for operation processing and internal control;
   a free running counter driven to count up at constant intervals;
   compare registers for holding contents to be compared with the count of said free running counter;
   comparators each of which compares the count of said free running counter with the content of a respective one of said compare registers and, at the time of a match therebetween, generates a timing signal;
   two latch circuits for storing either an on-signal or an off-signal with respect to each of a plurality of output terminals;
   a first signal generating arrangement connected to one of said two latch circuits, including ones of said compare registers, ones of said comparators, and a first gate for outputting a signal received from the latch circuit connected thereto at the timing of receiving a timing signal from respective ones of said comparators;
   a second signal generating arrangement connected to the other of said two latch circuits, including ones of said compare registers, ones of said comparators, and a second gate for outputting a signal from the latch circuit connected thereto at the timing of receiving a timing signal from respective ones of said comparators; and
   flip-flop gates each connected to said first signal generating arrangement and to said second signal generating arrangement, said first and second gates externally outputting pulse signals based on the signals received from the first and second signal generating arrangements.

6. A single-chip microcomputer according to claim 5, further comprising at least one unit of said first signal generating arrangement, at least one unit of said second signal generating arrangement, and at least one unit of said latch circuits.

7. A single-chip microcomputer according to claim 6, wherein said first signal generating arrangement and said second signal generating arrangement respectively effect the rise and the decay of pulse signals to be outputted externally.

8. A single-chip microcomputer according to claim 6, further comprising an arrangement for generating a clock signal at a frequency of at least 20 MHz.

9. A single-chip microcomputer, comprising:
- a CPU for operation processing and internal control;
- a free running counter driven to count up at constant intervals;
- compare registers for holding contents to be compared with the count of said free running counter;
- comparators each of which compares the count of said free running counter with the content of a respective one of said compare registers and, at the time of a match therebetween, generates a timing signal; and
- latch circuits for storing either an on-signal or an off-signal with respect to each of a plurality of output terminals at the timing of receiving the-timing signal from said comparators,
- wherein the number of said output terminals is greater than the number of said compare registers.

10. An engine control system comprising:
- an engine;
- a fuel injection valve for supplying fuel to said engine;
- an air flow meter for measuring the rates of air flow into said engine;
- a throttle valve for throttling the quantities of air flow into said engine; and
- a controller for controlling said fuel injection, said throttle valve, and said air flow meter,
- wherein said controller includes a single-chip microcomputer according to claim 1, 5 or 9.

11. An engine control system for an engine having a plurality of cylinders and fuel injection valves for supplying fuel to said cylinders comprising:
- an engine control unit having a single-chip microcomputer, said single-chip microcomputer comprising a CPU, a free running counter, compare registers, comparators, and latch circuits for storing either an on-signal or an off-signal with respect to each of said injection valves at the timing of receiving respective ones of timing signals from said comparators,
- wherein the number of said cylinders is greater than the number of said compare registers.

* * * * *